United States Patent [19]

Lambert

[11] Patent Number: 4,886,034
[45] Date of Patent: Dec. 12, 1989

[54] INTERNAL COMBUSTION ENGINE CONTROL SYSTEM

[75] Inventor: John E. Lambert, Dublin, Ohio
[73] Assignee: Gas Research Institute, Chicago, Ill.
[21] Appl. No.: 330,781
[22] Filed: Mar. 30, 1989
[51] Int. Cl.$^4$ .............................................. F02D 9/08
[52] U.S. Cl. .................................... 123/587; 261/47; 261/56; 261/68; 261/74
[58] Field of Search ............... 123/585, 586, 587, 525; 261/47, 56, 68, 74, 17

[56] References Cited

U.S. PATENT DOCUMENTS

| | | | |
|---|---|---|---|
| 3,608,872 | 9/1971 | Vozumi et al. | 261/47 |
| 4,446,834 | 5/1984 | Yoneda et al. | 123/587 |
| 4,491,109 | 1/1985 | Kishi et al. | 123/586 |
| 4,700,676 | 10/1987 | Harashima et al. | 123/585 |

FOREIGN PATENT DOCUMENTS 2424799 4/1975 Fed. Rep. of Germany ........ 261/47

Primary Examiner—Willis R. Wolfe
Assistant Examiner—M. Macy
Attorney, Agent, or Firm—Watkins, Dunbar & Pollick

[57] ABSTRACT

An internal combustion engine is provided with a biased by-pass throttle valve that trims the flow of supplementary combustion air for mixing with basic combustion air and fuel induced in carburetor venturi. The by-pass throttle valve is controlled by an electrical stepmotor that is regulated by a pre-programmed microprocessor in response to sensed engine speed and engine manifold pressure conditions to thereby improve engine operating efficiency and reduce noxious emissions without utilizing catalytic converter equipment.

9 Claims, 1 Drawing Sheet

INTERNAL COMBUSTION ENGINE CONTROL SYSTEM

FIELD OF INVENTION

This invention relates generally to internal combustion engines, and particularly concerns new improved apparatus and methods for regulating the flow of by-pass air to a natural gas-fueled internal combustion engine to achieve precise control of engine air/fuel ratio across the engine full range of load and speed, and also to assure engine high-efficiency operation and low pollutant emission, both without the use of catalytic converter emission control equipment.

BACKGROUND OF THE INVENTION

Heretofore the most commonly utilized internal combustion engines have generally utilized vaporized liquid petroleum fuel for motive power, have often controlled inlet air and fuel ratios to achieve stoichiometric balance for engine air-fuel combustion, and typically now require adjunct emission control equipment to reduce engine $NO_x$ emissions to below required minimum levels. Often such engines have utilized carburetor by-pass air features to control to a desired constant air/fuel ratio at different engine operating conditions. U.S. Pat. No. 2,365,968 to Mason discloses a carburetor utilizing by-pass air controlled by valves that respond to ambient temperature and throttle valve setting. U.S. Pat. No. 2,733,903 to Harmon also discloses a carburetor for an internal combustion engine but adds supplementary air in response to higher engine speed conditions sensed as reduced pressure at the engine intake manifold.

U.S. Pat. No. 3,174,469 to Rappolt utilizes by-pass air in an internal combustion engine but to overcome engine operating problems associated with condensed fuel. U.S. Pat. No. 3,023,745 to Barnes introduces supplementary air into supplementary venture devices in response to sensed engine operating pressure conditions.

U.S. Pat. No. 3,669,424 to Shiobara discloses an engine carburetor which utilizes downstream air/fuel pressure to vary the effective area of a venturi during engine idle operation. U.S. Pat. No. 3,831,808 discloses a carburetor arrangement wherein by-pass air is provided downstream of a venturi in response to a sensed operating altitude condition.

U.S. Pat. No. 3,561,409 to August utilizes by-pass air in a carburetor for a liquid-fueled engine during idling and during coasting or down-hill (low load) engine operation to minimize the emission of unburned fuel in the engine exhaust. U.S. Pat. No. 4,686,951 to Snyder likewise varies the flow of air to an internal combustion engine during engine operation but controls by-pass air as a function of a detected oxygen level in the engine exhaust. U.S. Pat. No. 3,846,094 to Baverstock also utilizes by-pass air in a carburetor arrangement such by-pass air being modulated in response to a sensed demand manifold pressure condition.

U.S. Pat. No. 4,373,500 to Haynes discloses an engine supplemental air valve arrangement that is controlled directly in response to actuation of the engine accelerator (throttle valve control).

U.S. Pat. No. 4,479,466 to Greenway et al. teaches arrangements for alternatively introducing natural gas fuel into an internal combustion engine that normally utilizes liquid petroleum fuel. A somewhat similar arrangement but proposed for introducing propane as an alternate fuel for an internal combustion engine is disclosed by U.S. Pat. No. 4,494,515 to Brown. U.S. Pat. No. 4,497,304 to Wintrell et al. also discloses a dual fuel internal combustion engine system.

Lastly, U.S. Pat. No. 4,670,194 to Buford et al. also discloses a carburetor construction wherein two different air inlets are utilized. The first inlet introduces a minor amount of air at a carburetor location to intermix with fuel, and the second inlet introduces additional air at a location downstream of the first inlet.

Such prior art arrangements do not achieve the precision operating control for natural gas-fueled internal combustion engines that is achieved with the hereinafter described and claimed internal combustion engine control system.

SUMMARY OF THE INVENTION

Basically, the present invention utilizes a microprocessor to precisely control the positioning of a carburetor throttle valve and the positioning of a carburetor air by-pass valve in a natural gas-fueled internal combustion engine system. Such precision control is achieved by microprocessor regulation of separate electrical incremental step motors connected to the carburetor valves. The novel control system runs open loop, and the microprocessor is responsive to a system engine speed (r.p.m.) command signal and a sensed actual engine speed condition and a sensed engine load condition. The engine carburetor venturi is basically designed and sized to provide a stoichiometric balance of air and natural gas fuel if the carburetor air by-pass throttle valve is fully closed. Under low-range speed and high-range speed operating conditions, the air by-pass valve is biased in an open condition to provide from approximately 40% to 60% air in excess of the stoichiometric balance. In mid-range speed operation the engine carburetor air bypass valve is trimmed from the biased open condition. The control system responds to sensed actual engine speed and to a hypothecated engine load programmed from sensed intake manifold pressure values corresponding to actual engine output torque. Supplementary pollution control equipment is not required by the internal combustion engine to meet current minimum pollution control standards, particularly those pertaining to $NO_x$ emissions. High engine operating efficiency is thereby obtained over a full range of engine operating speeds and loads.

When a carburetor is used to supply an air and fuel mixture to an engine of one or few cylinders, it is common to experience variation in the air/fuel ratio over the speed and load operating range of the engine. The principal cause of mixture variation is the pulsating nature of air flow through the carburetor. With he described invention, the mixture fluctuations can be nearly eliminated by adjusting bypass air to compensate for expected mixture variation, as determined from the prior engine testing.

The bypass valve can be used for controlled enrichment of the fuel to facilitate engine starting. The mixture enrichment can be gradually reduced over time in response to engine warm up as indicated by coolant temperature measurements. Thus, the bypass throttle valve obviates additional hardware such as a choke or primer.

The described invention can also provide compensation for external influences that would otherwise upset the air/fuel ratio control. Two such disturbances are air temperature changes and fuel chemistry changes.

The foregoing and other advantages of the invention will become apparent from the following disclosure in which a preferred embodiment of the invention is described in detail and illustrated in the accompanying drawings. It is contemplated that variations and structural features and arrangement of parts may appear to the person skilled in the art, without departing from the scope or sacrificing any of the advantages of the invention which is delineated in the included claims.

A PREFERRED EMBODIMENT OF THE BEST MODE OF CARRYING OUT THE INVENTION

Figure 1:
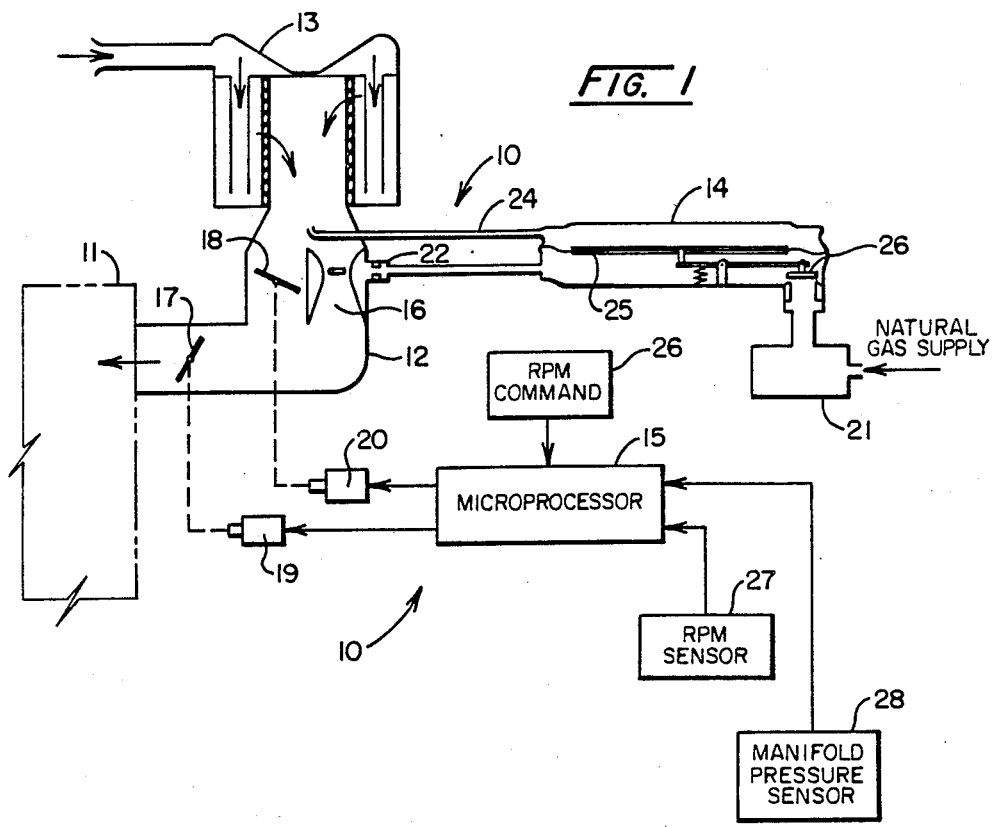
FIG. 1 is a schematic view of a preferred embodiment of the internal combustion engine control system of the present invention.

A preferred embodiment of the present invention is designated generally as 10 and is illustrated schematically in FIG. 1 of the drawings. System 10 is typically coupled to a conventional internal combustion engine 11 designed for the use of natural gas as a fuel although it is believed adaptable to an internal combustion engine using liquid petroleum fuel. In one actual embodiment of the system, control system 10 was coupled to a single-cylinder internal combustion engine utilized to drive the refrigeration compressor of a heat pump.

Control system 10 is basically comprised of a carburetor 12 of the down-draft type, a combined air intake silencer and filter 13, a fuel pressure governor 14, and a microprocessor control 15. Carburetor 12 includes a conventional venturi section 16, an engine throttle valve 17 of the butterfly type, and a by-pass throttle valve 18 also of the butterfly type. Throttle valve 17 is positioned by electrical step motor 19 controlled by microprocessor 15. By-pass valve 18 is positioned by electrical step motor 20 independently of valve 17 and likewise is controlled by microprocessor 15. In the actual embodiment of the invention referred to above step motors 19 and 20 were selected to operate in shaft movement increments of 0.9 degree in response to individual control pulses from microprocessor 15.

Fuel pressure governor 14 includes a conventional secondary or line pressure regulator 21 which feeds natural gas from the system fuel supply to the venturi nozzle 22. It also includes a balance line 24 which communicates the stagnation pressure detected at the entrance to venturi 16. Governor 14 further includes a flexible pressure diaphragm 25 which balances the pressure detected by line 24 against regulated fuel supply pressure controlled by regulator 21 and which further causes movement of governor valve 26 in response to detected imbalance. A reduction in detected stagnation pressure causes valve 26 to move in a closing direction thus reducing the flow of gaseous fuel to nozzle 22 to better maintain the desired fuel to air ratio. Placing a restrictive orifice in line 24 and venting the interior chamber of governor 14 above diaphragm 25 to the atmosphere through a restricted vent can still further improve the performance of governor 24 to compensate for different degrees of blockage of the filter in air intake 13. The position of the throttle 17 has been used effectively as an alternative to manifold pressure measurement.

System 10 is essentially completed by providing a conventional engine speed command input control input 26 to microprocessor 15 and also sensed engine speed and engine manifold pressure inputs 27 and 28 respectively. The RPM sensor, component 27, has been implemented with a Hall Effect sensor and, alternatively, with a variable reluctance magnetic pick-up; the manifold pressure sensing is accomplished with a peizoresistive sensor 28.

Figure 2:
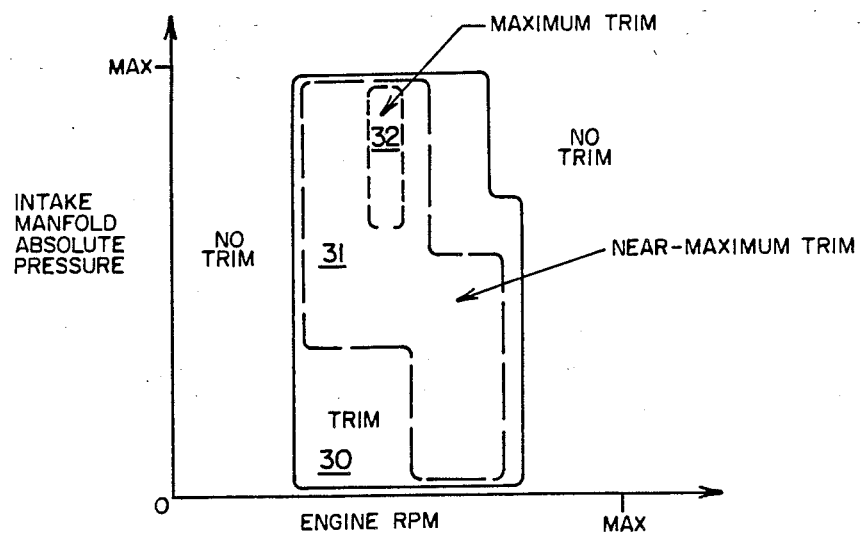
FIG. 2 is a graphical showing of various degrees of air by-pass valve trimming accomplished over the full range of engine speed and load conditions.

FIG. 2 schematically illustrates the manner by which microprocessor achieves trimming of by-pass throttle valve 18 within the area designated 30 by means of electrical step motor 20 in open loop response to engine speed and engine manifold absolute pressure conditions sensed by sensors 27, 28. Carburetor throttle valve 17 is essentially controlled by electrical step motor 19 in closed loop response to engine speed command signals generated by conventional electro-mechanical input device 26.

As shown in FIG. 2, by-pass valve 18 is trimmed by microprocessor 15 from its basic open position only when operating in the mid-range portion of its operating engine speed design range. Such trimming is accomplished to varying degrees also as a function of sensed intake manifold absolute pressure. Generally, and as illustrated in FIG. 2 by the area designated 32, maximum trim is effected only at upper range intake manifold absolute pressure values and then only in the centered portion of the engine operating speed mid-range. Such centered portion of the engine operating speed mid-range essentially corresponds to the engine design speed for steady operation with maximum operating life. Near-maximum trim 31 for by-pass throttle valve 18 is achieved, save for maximum trim, essentially throughout mid-range engine speeds with low intake manifold absolute pressure values and also except for high-mid range engine speeds and high intake manifold absolute pressure values.

In one actual embodiment of this invention involving a single cylinder internal combustion engine fueled by natural gas, engine by-pass throttle valve 18 was controlled to a basic 40° open position in a no-trim condition of from 0–500 rpm engine crankshaft rotational speed. Such no-trim basic open position was also maintained for operating speeds greater than approximately 3,100 rpm to as much as 4,100 rpm. However in the trim range, maximum trim ranging to an additional 9° degrees (49° total) was effected by electrical step motor 20 in response to program control signals from microprocessor 15. Such maximum trim basically centered on 1,500 engine rpm and a range of manifold absolute pressure values from 450 mm of Hg to 825 mm of Hg. Near-maximum trim values, as illustrated in FIG. 2, were from an additional 2° to 8° open. In this manner of trimming by-pass throttle valve 18, a maximum efficiency of engine operation was assured with very low combustion product pollutant emission being accomplished. No catalytic converter control equipment was required.

It is herein understood that although the present invention has been specifically disclosed with the preferred embodiments and examples, modifications and variations of the concepts herein disclosed may be resorted to by those skilled in the art. Such modifications and variations are considered to be within the scope of the invention and the appended claims.

I claim:

1. Internal combustion engine control system apparatus comprising:
   (a) carburetor venturi means flowing basic combustion air and having an induced fuel flow in said basic combustion air;
   (b) carburetor by-pass throttle valve means having a biased open position and causing and trimming the flow of supplementary combustion air parallel to and then into said basic combustion air for mixing;
   (c) engine throttle valve means regulating the flow of a mixture of said supplementary combustion air and said basic combustion air with induced fuel flow for engine combustion;
   (d) separate electrical step motor means connected to said carburetor by-pass throttle valve means and to said engine throttle valve means; and
   (e) pre-programmed microprocessor means connected to each of said electrical stepmotor means, said microprocessor means controlling one of said electrical stepmotor means and the trim positioning of said carburetor by-pass throttle valve means in response to sensed engine speed and sensed engine manifold pressure or throttle position conditions.

2. The apparatus defined by claim 1 wherein said microprocessor means controls the other of said electrical stepmotor means and the positioning of said engine throttle valve means in response to an engine speed command and a sensed engine speed condition.

3. The apparatus defined by claim 1 wherein said by-pass throttle valve means is biased in an open condition to provide a supplementary combustion air flow that is at least approximately from 40% to 60% of said carburetor venturi means basic combustion air flow in all engine operating conditions.

4. The apparatus defined by claim 1 wherein said microprocessor means controls the trim positioning of said carburetor by-pass throttle valve means to a maximum trim position in response to a sensed engine speed corresponding approximately to the engine steady operating condition design speed and in response to a sensed engine manifold pressure or throttle position corresponding approximately to within the upper portion of the design range.

5. The apparatus defined by claim 1 wherein said microprocessor means controls the trim positioning of said carburetor by-pass throttle valve means to a near-zero trim position in response to a sensed engine speed corresponding to within approximately the below mid-range or above mid-range engine operating condition design speed range.

6. A method of controlling the flow of air and fuel to an internal combustion engine, comprising the steps of:
   (a) flowing a quantity of basic combustion air and induced fuel;
   (b) flowing a biased quantity of supplementary combustion air;
   (c) mixing said supplementary combustion air with said and basic combustion air and induced fuel;
   (d) regulating the flow of said mixed air to the internal combustion engine in response to an engine speed command signal; and
   (e) trimming the flow of said biased quantity of supplementary air in response to a sensed engine speed condition and in response to a sensed engine manifold pressure or throttle position condition.

7. The method defined by claim 6 wherein said biased quantity of supplementary air is approximately 40% to 60% said quantity of basic combustion air and induced fuel.

8. The method defined by claim 6 wherein said trimming of the flow of supplementary air is a maximum trimming in response to a sensed engine speed condition corresponding approximately to the engine steady operating condition design speed and in response to a sensed engine manifold pressure or throttle position condition corresponding approximately to within the upper portion of the engine operating manifold pressure condition design range.

9. The method defined by claim 8 wherein said trimming of the flow of supplementary air is a near-zero trimming in response to sensed engine speed conditions corresponding to within approximately the below mid-range and above mid-range engine operating condition design speed range.

* * * * *